United States Patent Office 2,763,624
Patented Sept. 18, 1956

2,763,624

POLYESTER-POLYISOCYANATE RESINS REINFORCED WITH FIBERS CONTAINING CARBONAMIDE GROUPS

Isaac L. Newell, Wethersfield, Conn., assignor to United Aircraft Corporation, East Hartford, Conn., a corporation of Delaware No Drawing. Application January 27, 1951,
Serial No. 208,225

12 Claims. (Cl. 260—2.5)

The present invention relates to a novel and improved reinforced stable and rigid resin, which may be produced as a reinforced stable foam, and is produced by the reaction between organic polyisocyanates, polyesters and fibrous amides.

Objects and advantages of the invention will be set forth in part hereinafter and in part will be obvious herefrom, or may be learned by practice with the invention, the same being realized and attained by means of the processes, steps, compositions and combinations pointed out in the appended claims.

The invention consists in the novel steps, processes, compositions and improvements herein shown and described.

The present invention has for its object the provision of novel and improved resin compositions incorporating fibrous material and having relatively high strength, good temperature resistance and improved mechanical properties. A further object is the provision of a process of preparing resin foams which are characterized by an improved uniformity of cell structure, fine cell size and have better friability, compressive strength, flexural strength, tensile strength, and temperature resistance properties than foams hereto produced.

The present invention is, in certain respects, an improvement upon the invention disclosed and claimed in the prior applications of Serial No. 195,152, filed November 10, 1950, now abandoned, and Serial No. 198,902, filed December 2, 1950, now Patent No. 2,676,157, but in other respects it is of more general application.

Heretofore the foams produced by the reaction of an organic polyisocyanate with polyesters have often been characterized by uneven cell structure and coarse cells, and difficulty has been experienced in obtaining rigid foams which show desirable mechanical properties and have good temperature resistance. These difficulties have been overcome by the present invention which makes it possible to accurately control the foam produced, and to assure that the foam will have the desired fineness of structure and good properties.

In accordance with the present invention, the resin composition or foam is produced by the reaction of organic polyisocyanates with polyesters in the presence of substantially uniformly distributed fibrous material, which fibers are composed of organic compounds containing amide groups, each having at least one active hydrogen atom which is available for reaction with an isocyanate radical.

In case an extremely dense, rigid, high strength resin with excellent temperature resistance and excellent mechanical properties is desired, the resin composition of the present invention may be reacted in a confined space so it cannot foam, and a solid resin composition having substantially no cell structure results, such a composition being reinforced by the dispersed fibrous material which has reacted with a polyisocyanate radical of the resin.

The polyesters suitable for use in carrying out the present invention are those polyesters formed by the reaction of a dicarboxylic organic acid with a polyhydric alcohol which is preferably a triol. The fibrous material used is a short organic fiber containing amide groups at least some of which groups contain an active hydrogen atom, and includes such organic fibers as nylon, wool, silk, hair and synthetic fibers made from casein and other amino acid compounds. The polyesters used may be produced by the reaction of one or more of the dicarboxylic organic acids with one or more polyhydric alcohols, and if desired may be modified during the reaction with a fatty acid or glyceride, a monocarboxylic acid or one or more aldehydes. The reaction of the polyester so produced with the organic polyisocyanate may be carried out in the presence of a small amount of water, amines, alkalies or acetone, particularly if foams of extremely low density are to be produced.

The inclusion of the short organic fibers containing active amino groups with active hydrogens in the polyester resin at the time of its reaction with the polyisocyanate markedly improves the friability resistance, compressive strength, flexural strength, tensile strength, toughness and temperature resistance of the resulting compositions and if the resin is allowed to foam makes the cell structure more uniform and of finer size. As the reaction proceeds with the polyisocyanate, the fibers not only physically reinforce the cell walls of the foam structure, but are also chemically linked to the polyester-polyisocyanate structure by the reaction of the polyisocyanate with the amide groups present in the fibers.

The fibers which may be usefully employed in connection with the present invention are preferably short, organic fibers having a length of 5 to 10 times their diameter, and composed largely of fibers having a minimum length of at least 0.01 mm. and principally less than 10.0 mm., and from 1% to 20% and preferably about 10% of the weight of the final foam, may be composed of such organic fibers. Wool and other hair, such as rabbit hair, silk, and fine synthetic fibers from casein("Aralac"), may be used, but nylon fibers having a diameter of from 0.01 to 0.03 mm., and less preferably from 0.01 to 1.0 mm., are preferred due to the excellent strength and temperature properties of the resulting foam.

The term "nylon" as used herein means a long chain, synthetic polymeric amide which has recurring amide groups as an integral part of the main polymer chain and which is capable of being formed into a filament in which the structural elements are oriented in the direction of the axis. Thus, the term "nylon" refers to an entire family of polyamide resins which are generally products of the reaction of dicarboxylic acids and diamines, carried out in such a way that predominantly linear polymers are formed. The resins vary according to (1) the type of dibasic acid used, (2) the type of diamine used, (3) the proportion of ingredients in the reaction and (4) the method and the extent of polymerization. Moreover, two or more nylon polymers may be blended to give compositions different from the parent nylons. Thus, an almost unlimited number of nylons is possible, each with its characteristic physical properties.

One of the many nylon fibers suitable for use in connection with the present invention is the 6–6 nylon which contains an amide group for every six carbon atoms having a free hydrogen, and is formed from hexamethylene diamine and adipic acid.

In general any of the polycarboxylic, and preferably dicarboxylic, organic acids such as adipic, phthalic, maleic, sebacic, methylenedisalicylic, tetrachlorophthalic, itaconic, oxalic, diglycolic, acids are suitable and may be used to react with the polyhydroxy alcohol to form the polyester resin. If convenient, these acids may be used in the form of the anhydride such as phthalic anhydride. For most purposes it is preferable to use a mixture of two such acids, one an aromatic dicarboxylic acid and the other an aliphatic dicarboxylic acid.

Polyhydric alcohols which are useful include the alkyl polyhydroxy alcohols such as glycol, polyglycol, polyethyleneglycol and phenols such as pyrogallol and resorcincol, but preferably those alcohols containing at least three or more hydroxy groups such as glycerol, sorbitol, mannitol, pentaerythritol, trimethylolpropane and trimethylolethane.

In some instances, less preferably tribasic acids may be reacted with diols to produce the polyester resin, and for this purpose tricarballylic, citric, camphoronic, aconitic or trimesic acids may be reacted with a diol such as ethylene glycol, diethylene glycol, pyrogallol, resorcinol, quinol, propylene glycol.

Where a diol is reacted with a tricarboxylic acid about 2 to about 4 mols of diol are reacted with about 1 mol of tricarboxylic acid, while if a triol is reacted with a dicarboxylic acid, about 2 mols of triol are reacted with about 1 to 3 mols of dicarboxylic acid. If desired, the dicarboxylic or tricarboxylic acid portion, may be and preferably is formed of two or more such acids, while the diol, triol or other polyhydric alcohol is usually, although not necessarily a single alcohol. Thus, in general, the acid-alcohol ratio should always be adjusted so that the polyester may be cooked to an acid number of from 10 to 75 and preferably from 20 to 60, with about 40 or 45 being an optimum, when producing a reinforced foam having a density of about 15 lbs. per cubic foot.

The dicarboxylic acid and the polyhydric alcohol are reacted by heating and the reaction is carried on until the acid number is 75 or less. The water formed during the reaction is removed in the manner usual in the making of alkyd resins. If desired, and it is often preferable, the reacting mixture may includes modifiers to limit and control the length of the molecular chain of the polyester or alkyd resin, and for this purpose various monobasic acids are suitable additions to the reaction mixture. Among the monobasic acids which are preferred when high resistance to heat distortion is desired are formic, acetic, propionic, butyric, valeric, caproic, enanthic, caprylic, pelargonic, capric, lauric, benzoic, lactic sorbic and their unsaturated analogues.

Aldehydes may also be used to limit and control the length of the polyester chain. Among the aldehydes which are suitable for this purpose are formaldehyde, acetaldehyde, butyraldehyde, propionaldehyde, 2-ethylbutyraldehyde, 2-ethylhexaldehyde, and unsaturated aldehydes, such as crotonaldehyde, 2-ethyl-3 propylacrolein, acrolein, and aromatic aldehydes such as benzaldehyde and furfuraldehyde. Low molecular weight aldehydes produce more heat resistant foams.

In certain instances, other substances may be added to vary the density of the final foam, suitable reagents being water, ketones, amines, calcium oxide and the other alkaline earth oxides, and the monobasic acids referred to above.

Where extremely light foams are desired, up to several percent of water or acetone may be added to or allowed to remain in the alkyd resin.

When the polyester resin has been formed, short organic fibers containing the active amide group are added so that the fibers become uniformly distributed throughout the resin, and the amount of fibers added may vary from 1% to 400% of the weight of the resin, although the fibers are preferably added in the amount of 1% to 20% of the resin-fiber mixture to be foamed, and from 10% to 400% if the resin is not to be foamed.

Such a resin or polyester containing the dispersed organic amide fibers is then reacted with a diisocyanate, such as toluene diisocyanate, hexamethylene diisocyanate, methylene diisocyanate (methylene - bis-4-phenylisocyanate or p, p' methylene-diphenyl-diisocyanate). Sufficient diisocyanate may be used to react with all of the polyester resin and the dispersed amide fibers, and the reaction usually proceeds rapidly at once, although it may be hastened by heating if desired. In any event, the polyisocyanate is thoroughly and rapidly mixed with the polyester. Some additional quantity of the polyisocyanate may be used so that a portion of the isocyanate remains unreacted, or merely enough may be used to set the resin to the desired state of polymerization.

As specific examples of the methods and formulae in accordance with the present invention, the following are given:

1. One mol phthalic anhydride, two mols adipic acid and four mols glycerine are brought to 200° C. and allowed to cook at that temperature until an acid number less than 75 is reached. Water formed during the reaction is removed by any suitable method familiar to one skilled in the art of making alkyds. When the acid number of the resin is at any desired value between 10 and 75, the reaction product is cooled to about 160° C. and a weight of short, fine nylon fibers, equivalent to one or two percent of the weight of the polyester resin, is then added with vigorous stirring. The reaction product is then cooled to room temperature. To sixty parts by weight of the reaction product, 40 parts by weight of toluene diisocyanate are added, the mixture is vigorously stirred until complete blending is obtained, and is then allowed to foam.

2. To the same mixture of polyester, 10% of rabbit hair, wool or short silk fibers or casein fibers may be substituted for the nylon fibers, after which the mixture is foamed in the same manner.

3. One mol tetrachlorphthalic anhydride, two mols adipic acid and four mols trimethylolpropane are brought to 200° C. and allowed to cook at that temperature until an acid number less than 75 is reached. Water formed during the reaction is removed by any suitable method familiar to one skilled in the art of making alkyds. When the acid number of the resin is at any desired value between 10 and 75, the reaction product is cooled to 160° C. and a weight of short, fine nylon fibers equivalent to the weight of the polyester resin is then added with vigorous stirring. The reaction product is then cooled to room temperature. To sixty parts by weight of the reaction product, forty parts by weight of p, p' methylene-diphenyl-diisocyanate are added and the mixture is vigorously stirred until complete blending is obtained. The mixture is then heated to 65° C. for foaming. Curing of the foam may be accomplished by heating it one hour at 65° C., one hour at 121° C. and one-half hour at 106° C.

4. One mol phthalic anhydride, one mol adipic acid, one mole maleic anhydride and four mols of trimethylolethane are brought to 200 C. and allowed to cook at that temperature until an acid number less than 75 is reached. Water formed during the reaction is removed by any suitable method familiar to one skilled in the art of making alkyds. When the acid number of the resin is at any desired value between 10 and 75, the reaction product is cooled to 160° C. and a weight of short, fine nylon or other amide fibers equivalent to 10%, more or less, of the resin weight is then added with vigorous stirring. The reaction product is then cooled to room temperature. To sixty parts by weight of the reaction product, forty parts by weight of toluene diisocyanate are added, the mixture viborously stirred until complete blending is obtained, and then allowed to foam, after which the foam may be heat-cured, if desired.

*Example 5*

| | Grams |
|---|---|
| 1 mol phthalic anhydride | 42.5 |
| 2 mols adipic acid | 84.0 |
| 0.35 mol caproic acid | 11.7 |
| 4 mols trimethylolpropane | 154.0 | reacted by heating to an acid number between 20 and 60 after which the water is removed and up to 6 grams of water or acetone added. Then about 25 grams of nylon flock fibers are thoroughly mixed into the polyester resin, after which it is reacted and foamed by mixing about 220 grams of toluenediisocyanate.

Among other specific polyester-fiber mixtures which may be reacted with appropriate amounts of the polyisocyanate to produce foamed or unfoamed structures are the polyester resins formed from the following mixtures of dicarboxylic acids with polyhydric alcohols, with modifiers chosen from the monobasic acids and andehydes, which polyesters are mixed with from 1 to 20% of an active fiber (having amide groups with reactive hydrogen atoms), such as nylon, wool, silk, hair or casein fiber, and after thorough mixing of the fiber with the polyester, the mixture is mixed with a polyisocyanate and allowed to foam or not, as desired. Then the resulting rigid structure may be cured by heat treatment over a period of several hours at temperatures usually from about 65° C. to 121° C.

Such polyester compositions are as follows:

Example 6

| | Grams |
|---|---|
| Phthalic anhydride | 85.0 |
| Adipic acid | 168.0 |
| Caproic acid | 23.4 |
| Glycerol | 211.4 |

Example 7

| | |
|---|---|
| Phthalic anhydride | 85.2 |
| Adipic acid | 168.0 |
| Trimethylol propane | 308.0 |
| Caproic acid | 33.3 |

Example 8

| | |
|---|---|
| Phthalic anhydride | 42.5 |
| Adipic acid | 168.0 |
| Trimethylolol propane | 308.0 |
| Caproic acid | 33.3 |
| Tetrachlorophthalic anhydride | 82.2 |

Example 9

| | |
|---|---|
| Phthalic anhydride | 85.0 |
| Adipic acid | 168.9 |
| Caproic acid | 33.3 |
| Trimethylolethane | 276.0 |

Example 10

| | |
|---|---|
| Diethylene glycol | 10.6 |
| Pentaerythritol | 34.0 |
| Sebacic acid | 60.6 |

Example 11

| | |
|---|---|
| Phthalic anhydride | 85.0 |
| Adipic acid | 168.0 |
| Trimethylol propane | 231.0 |
| Caproic acid | 33.3 |
| Pentaerythritol | 39.0 |

Example 12

| | |
|---|---|
| Phthalic anhydride | 85.0 |
| Adipic acid | 126.0 |
| Trimethylol propane | 308.0 |
| Caproic acid | 33.3 |
| Maleic acid | 33.3 |

Example 13

| | |
|---|---|
| Phthalic anhydride | 85.0 |
| Adipic acid | 126.0 |
| Trimethylol propane | 308.0 |
| Caproic acid | 33.3 |
| Itaconic acid | 37.3 |

Example 14

| | Grams |
|---|---|
| Phthalic anhydride | 85.0 |
| Adipic acid | 168.0 |
| Trimethylol propane | 308.0 |
| Lauric acid | 57.5 |

Example 15

| | |
|---|---|
| Phthalic anhydride | 85.0 |
| Adipic acid | 168.0 |
| Trimethylol propane | 308.0 |
| Propionic acid | 14.8 |

Example 16

| | |
|---|---|
| Phthalic anhydride | 85.0 |
| Adipic acid | 168.0 |
| Trimethylol propane | 308.0 |
| Formic acid | 10.6 |

Example 17

| | |
|---|---|
| Phthalic anhydride | 85.0 |
| Adipic acid | 168.0 |
| Trimethylol propane | 308.0 |
| Lactic acid | 21.3 |

Example 18

| | |
|---|---|
| Phthalic anhydride | 85.0 |
| Adipic acid | 168.0 |
| Trimethylol propane | 308.0 |
| Sorbic acid | 22.5 |

Example 19

| | |
|---|---|
| 1.0 mol phthalic anhydride | 85.0 |
| 2.0 mol adipic acid | 168.0 |
| 0.35 mol glyoxal | 33.7 |
| 4.0 mol trimethylolpropane | 308.0 |
| Total | 594.7 |

Example 20

| | |
|---|---|
| 0.5 mol phthalic anhydride | 42.5 |
| 0.5 mol maleic acid | 33.3 |
| 2.0 mol adipic acid | 168.0 |
| 0.5 2-ethyl butyraldehyde | 28.8 |
| 4.0 mol trimethylolpropane | 308.0 |
| Total | 580.6 |

Example 21

| | |
|---|---|
| 1.0 mol phthalic anhydride | 85.0 |
| 2.0 mol adipic acid | 168.0 |
| .35 mol furfural | 19.3 |
| 4.0 mol trimethylolpropane | 308.0 |
| Total | 580.3 |

Example 22

| | |
|---|---|
| 1.0 mol phthalic anhydride | 85.0 |
| 2.0 mol adipic acid | 168.0 |
| 0.50 mol benzaldehyde | 30.5 |
| 4.0 mol trimethylolpropane | 308.0 |
| Total | 591.5 |

Example 23

| | |
|---|---|
| 1.0 mol phthalic anhydride | 85.0 |
| 2.0 mol adipic acid | 168.0 |
| .25 mol 2-ethyl 3-propyl acrolein | 18.0 |
| 4.0 mol trimethylolpropane | 308.0 |
| Total | 579.0 |

Example 24

| | Grams |
|---|---|
| 1.0 mol phthalic anhydride | 85.0 |
| 2.0 mol adipic acid | 168.0 |
| 0.35 mol pyruvic aldehyde | 48.0 |
| 4.0 mol trimethylolpropane | 308.0 |
| Total | 609.0 |

Example 25

| | Grams |
|---|---|
| 1.0 mol phthalic anhydride | 85.0 |
| 2.0 mol adipic acid | 168.0 |
| 0.35 mol propionaldehyde | 11.6 |
| 4.0 mol trimethylolpropane | 308.0 |
| Total | 572.6 |

Example 26

| | Grams |
|---|---|
| 1.0 mol phthalic anhydride | 144.5 |
| 2.0 mol adipic acid | 285.6 |
| 0.35 mol caproic acid | 39.8 |
| 4.0 mol glycerol | 359.4 |
| Aluminum powder | 148.0 |

The aluminum powder is added after the resin is reacted and cooled to room temperature.

In each example of polyester resin, the polyester may be mixed thoroughly with from about 1% to 400% of its weight with the short fiber having active amide groups and after being so mixed is reacted in a self-intumescent manner with the appropriate amount of a polyisocyanate for the polyester resin, or restrained from intumescence, after which the rigid structure may be cured by appropriate heat treatment.

Mixtures of polyester resins with from 1.0% to 400% of its weight of short fibers having active amide groups and further mixed with the appropriate quantity of a polyisocyanate for the polyester resin, may be allowed to react under restraining pressure so as to produce denser foams or even solid resinous masses free of voids. In general the various examples set forth above may be so reacted under varying degrees of pressure, dependent upon the density desired, and where the solid resin masses are desired, the materials will generally be reacted in a closed vessel or mold, while subjected to extremely high pressures, approximately 1,000 pounds per square inch or higher. After the reaction has been completed the resinous mass is cured by appropriate heat treatment.

Example 27

The procedure of Example 1 is followed with the same materials except that the mixture, prior to the start of foaming is poured into a vessel and restrained by the application of 200 pounds per square inch pressure until the foaming reaction has been completed. The resulting resin has a density of 55 pounds per cubic foot, and after curing for one hour at 65° C. and 3 hours at 106° C., the material forms an extremely tough and strong resin which is only slightly foamed.

Example 28

The procedure of Example 27 is followed with the same materials except that foaming is completely restrained by application of 1000 pounds per square inch pressure. After curing for one hour at 65° C. and 3 hours at 106° C., an extremely tough and strong solid resin is produced.

The invention in its broader aspects is not limited to the specific process and steps shown and described but departures may be made therefrom within the scope of the accompanying claims without departing from the principles of the invention and without sacrificing its chief advantages.

What is claimed is:

1. A process of forming stable, reinforced foam resins comprising reacting an organic polyisocyanate with a mixture of short length organic fibers which are principally less than 10 mm. in length of random orientation selected from the group consisting of long chain synthetic polymeric amides having recurring carbonamide groups as integral part of the main polymer chain, wool, silk, hair and casein fibers, said fibers containing carbonamide groups having active hydrogens, and a polyester resin of an acid number between 10 and 75 formed by the reaction of a polycarboxylic organic acid with a polyhydric alcohol, said polyisocyanate being present in a sufficient amount to react with all of the polyester and the dispersed fiber, said fiber being presented in an amount from 1 to 20% of the total resin-fiber mixture.

2. A process as defined in claim 1, wherein the acid is dicarboxylic acid and the alcohol contains at least three hydroxy groups.

3. A process as defined in claim 2, in which the polyisocyanate is a diisocyanate.

4. A process as defined in claim 3, in which the alcohol is glycerine.

5. A process as defined in claim 4, in which the polyester resin has been reacted with a monocarboxylic acid.

6. A process as defined in claim 4, in which the polyester has been reacted with an aldehyde.

7. A stable, reinforced foam composition produced in accordance with the process of claim 1.

8. A stable, reinforced foam composition produced in accordance with the process of claim 2.

9. A stable, reinforced foam composition produced in accordance with the process of claim 3.

10. A stable, reinforced foam composition produced in accordance with the process of claim 4.

11. A stable, reinforced foam composition produced in accordance with the process of claim 5.

12. A stable, reinforced foam composition produced in accordance with the process of claim 6.

References Cited in the file of this patent

UNITED STATES PATENTS

| 1,918,187 | Kirner | July 11, 1933 |
| 2,140,062 | Talalay | Dec. 13, 1938 |
| 2,194,036 | Talalay | Mar. 19, 1940 |
| 2,430,479 | Pratt et al. | Nov. 11, 1947 |
| 2,491,409 | Kropa et al. | Dec. 13, 1949 |
| 2,529,512 | Ott | Nov. 14, 1950 |
| 2,577,281 | Simon et al. | Dec. 4, 1951 |

FOREIGN PATENTS

| 582,807 | Great Britain | Nov. 28, 1946 |

OTHER REFERENCES

De Bell et al.: "German Plastics Practice," pub. 1946 by De Bell and Richardson, Springfield, Mass., pp. 463–465.